United States Patent [19]

Metcalfe et al.

[11] Patent Number: 4,952,456
[45] Date of Patent: Aug. 28, 1990

[54] EPOXIDE ADVANCEMENT

[75] Inventors: Ronald Metcalfe, Caudebec-les-Elbeuf, France; Frederick A. Waite, Farnham Common, France

[73] Assignees: Imperial Chemical Industries PLC, London, England; Holden Europe S.A., Caudebec-les-Elbeuf, France

[21] Appl. No.: 279,618

[22] Filed: Dec. 5, 1988

[30] Foreign Application Priority Data

Dec. 4, 1987 [EP] European Pat. Off. ........ 87402769.1

[51] Int. Cl.$^5$ .................... B32B 27/38; C08L 63/10; C08L 63/00; C08K 5/01
[52] U.S. Cl. .................................... 428/413; 427/386; 523/400; 523/462; 523/463; 525/119; 525/122
[58] Field of Search ...................... 523/400, 462, 463; 525/119, 122; 427/386; 428/413

[56] References Cited

U.S. PATENT DOCUMENTS

| | | | |
|---|---|---|---|
| 3,297,784 | 1/1967 | Snedeker et al. | 525/199 |
| 3,931,109 | 1/1976 | Martin | 523/463 |
| 4,122,067 | 10/1978 | Anderson | 523/400 |
| 4,341,682 | 7/1982 | Tobias | 523/409 |
| 4,579,887 | 4/1986 | Mizusawa et al. | 523/400 |

OTHER PUBLICATIONS

Patent Abstracts of Japan, vol. 10, No. 239, p. 125, C 367 (Nippon Oil and Fats Company Ltd.).

Primary Examiner—Lewis T. Jacobs
Attorney, Agent, or Firm—Cushman, Darby & Cushman

[57] ABSTRACT

A process for preparing a sterically stabilized non aqueous dispersion of a polyepoxide of epoxy equivalent weight in the range 350 to infinity, which comprises reacting a sterically stabilized non-aqueous dispersion of a compound with at least two epoxy groups with a diol of formula (1)

HOBOH (1)

in which B is a group of formula (2)

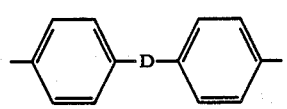

where D is a methylene group or propane -2, 2-diyl.

16 Claims, No Drawings

EPOXIDE ADVANCEMENT

This invention relates to a process for preparing sterically stabilised dispersions of epoxy resin particles in a non-polar organic liquid carrier.

Known processes for producing non-aqueous dispersions of epoxy resins involve simple dispersion of the epoxy resin in a non-aqueous medium in the presence of a suitable stabiliser. An example of such a process is described in British Patent No. 1 458 607. Commonly the epoxy resins are prepared by a process of epoxide advancement. In epoxide advancement suitable epoxides of low epoxy equivalent weight are reacted with difunctional materials such as diols and this reaction results in epoxy resins of higher epoxy equivalent weight. Such a two stage process of an advancement step followed by a dispersion step is described in U.S. Pat. No. 4,579,887. In practice, it is found that such a two stage process is very cumbersome. This is particularly so as the higher epoxy equivalent weight epoxides are commonly highly viscous or solid at ambient temperatures and must be heated to high temperatures to allow the dispersion to be made. The dispersion step then usually either comprises feeding the continuous phase into the hot viscous epoxide melt or more commonly pumping the hot epoxide into the continuous phase. We have now found that it is possible to greatly simplify this former two stage process.

According to the present invention, there is provided a process for preparing a sterically stabilised non-aqueous dispersion of a polyepoxide of epoxy equivalent weight in the range 350 to infinity, which comprises reacting a sterically stabilised non aqueous dispersion of a compound with at least two epoxy groups with a diol of formula 1:

HOBOH        (1)

in which B is a group of formula (2)

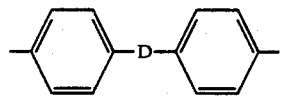

(2)

where D is a methylene group or propane-2,2-diyl.

By 'polyepoxide' is meant a polymeric material which is derived in part from an epoxy functional starting material. It will be readily appreciated that the polyepoxide may be either epoxy terminated or aromatic hydroxyl terminated depending on the relative proportions of the diol of formula (1) and the compound with at least two epoxy groups used in the process. An excess of epoxide will result in a predominantly epoxy functional polyepoxide and an excess of diol will result in a predominantly hydroxy functional polyepoxide.

Referring to the diol of formula (1), B is preferably a group of formula (2) where D is propane-2,2-diyl. Diols of formula (1) are available commercially. Those where D is propane-2,2-diyl are known as bisphenol A or diphenylol propane (DPP). Those where D is methylene are known as bisphenol F, or diphenylol methane (DPM).

Minor proportions of the diol of formula (1) may be replaced by other difunctional compounds which will react with epoxy groups. Such difunctional compounds may for example, be added to improve the physical properties such as flexibility of films or blocks formed from the compositions by later removal of the continuous phase.

Examples of this are the improvements in flexibility obtained by the replacement of some of the diol with flexibilisers such as adipic acid or dimerised fatty acid.

An example of one class of polyepoxide which may be prepared by the process of the invention are those which are prepared by reacting an epoxy novolac compound with a diol of formula (1). Epoxy novolacs may be approximated as a phenol novolac resin containing groups such as those given in formula (3).

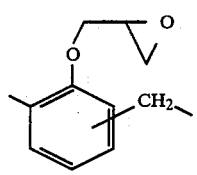

An example of a preferred class of polyepoxide which may be prepared by the process of the invention are those of formula (4);

$$A^1OBO[A^2OBO]_aA^1 \quad (4)$$

where a is a number such that the epoxy equivalent weight is in the range 350 to infinity, and B is a group of formula (2). Polyepoxides of formula (4) are prepared by reacting a diol of formula (1) with a compound with two epoxy groups.

One example of a class of compounds with two epoxy groups useful in the process of the invention to give dispersions of polyepoxide of formula (4) are those of formula (5).

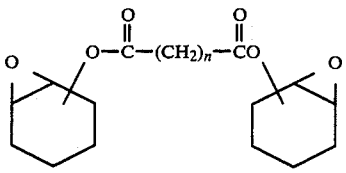

in which n is from 1 to 4. Use of a compound of formula (5) in the process of the invention gives rise to dispersions of formula (4) in which $A^1$ is hydrogen or a group of formula (6).

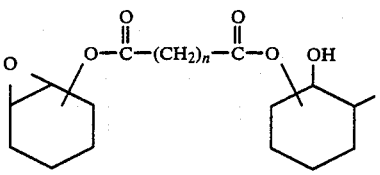

in which n is as defined in formula (5), and $A^2$ is a group of formula (7).

rise to dispersions of formula (4) in which $A^1$ is hydrogen or a group of formula (12);

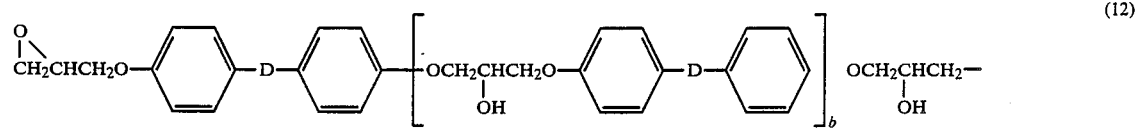

where D and b are as defined with reference to formula (11), and in which $A^2$ is a group of formula (13).

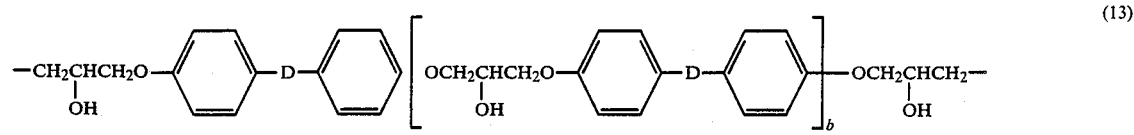

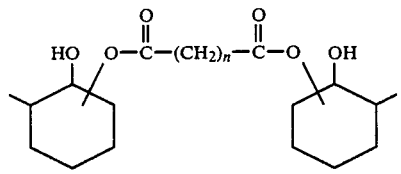

in which n is as defined in formula (5).

A further example of a compound with two epoxy groups useful in the process of the invention to give dispersions of polyepoxide of formula (4) is a compound of formula (8).

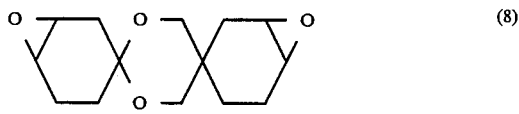

Use of a compound of formula (8) is the process of the invention gives rise to dispersions of formula (4) in which $A^1$ is hydrogen or a group of formula (9).

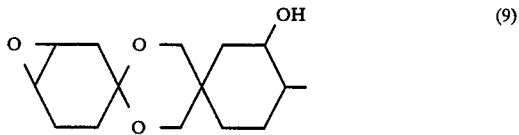

and $A^2$ is a group of formula (10)

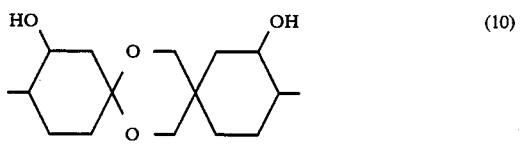

An example of a preferred class of compounds with two epoxy groups useful in the process of the invention to give dispersions of polyepoxide of formula (4) are those of formula (11).

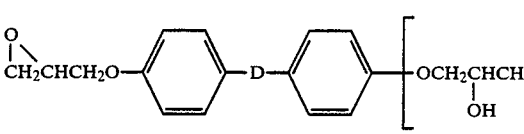

where D is as defined with reference to formula (2) and b is from 0 to 2. Using compounds of formula (11) gives where D and b are as defined with reference to formula (11). It will of course be appreciated that formulas (11), (12) and (13) are idealised structural formulae.

In practice the epoxy equivalent weight is 350 to 500,000, more particularly 350 to 250,000 or 350 to 5,000 or 350 to 15,000.

It will be understood by those skilled in the Art that where the polyepoxide product is predominantly aromatic hydroxy terminated it will have a very large epoxy equivalent weight.

Epoxy novolacs containing groups of approximate formula (3) may be made by the reaction of a novolac resin with epichlorohydrin. Epoxy novolacs of this type are commercially available from Ciba Giegy Chemicals as XPY 307 or EPN 1139 or from Dow Chemicals as DEN 438.

Referring to the diepoxides of formula (5) n is preferably 4. A diepoxide of formula (5) in which n is 4 is available as ERL 4299 from Ciba Giegy Chemicals.

A diepoxide of formula (8) is available as Diepoxide 133 from Degussa Chemicals.

Referring to the epoxide (11), D is preferably propane-2,2-diyl. Values for b can be 0, 1 or 2 or a fractional value.

The epoxides of formula (11) are commercially available and are supplied as mixtures with slight impurities so the value for b can be a fraction.

In particular, b is 0.1.

Examples of epoxides of Formula (11) which can be used in the process of this invention are: Epikote 828 where D is propane-2,2-diyl and b is 0.1 GY 250 or DER 330 or DER 333 where D is propane-2,2-diyl and b is 0.1.

Epikote is a Registered Trade Mark and Epikote resins are available from Shell Chemicals. GY250 is available from Ciba-Giegy. DER 330 or DER 333 are from Dow Chemicals.

It will be understood that all of these epoxide functional compounds are technical grade materials subject to minor variations in structure and in the level of impurities.

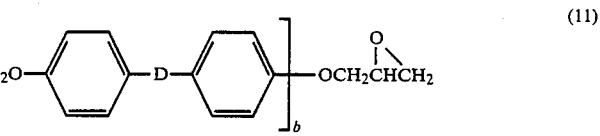

The epoxides reacts with the diol in a sterically stabilised dispersion. The dispersion is maintained by a steric stabilising agent. A steric stabilising agent is a compound in which the molecule is essentially amphipathic. That is, it has chain-like part which associates with the epoxide to be dispersed (this is referred to as an anchor component) and another chain-like part which associates with the liquid (this is referred to solvated component).

For example, the stabiliser can have an anchor component based on an acrylate polymer. Suitable acrylate polymers are homopolymers and co-polymers of acrylic acid esters (for example polymethyl methacrylate, polyethyl methacrylate, polymethyl acrylate, polymethyl methacrylate, co-ethyl methacrylate polyethyl acrylate) and co-polymers of acrylate esters and acrylic and methacrylic acid. In such co-polymers, acrylic acid or methacrylic acid derived units make up no more than 10% by weight of the co-polymer. There may also be present minor proportions of itaconic acid, crotonic acid maleic acid or alkyl esters of those acids.

The solvated component can be a poly $C_{6-18}$ alkyl acrylic ester for example poly-2-ethyl hexyl acrylate, a polyester, for example poly-12-hydroxy stearic acid or a hydrocarbon, for example polybutadiene or degraded natural rubber.

Preferably the stabiliser is one where the anchor component is a co-polymer of methyl methacrylate and acrylic acid or methacrylic acid. Preferably the stabiliser is one where the solvated component is derived from polybutadiene.

The stabilisers can be made by standard methods. For example, where the anchor component is an acrylate polymer and the solvated component is poly-12-hydroxy stearic acid, the stabiliser can be prepared by co-polymerising the reaction product of glycidyl(meth)acrylate and poly-12-hydroxystearic acid and the acrylate monomers. Where the anchor component is an acrylate polymer and the solvated component is a hydrocarbon or a poly $C_{6-18}$ alkyl acrylic ester the stabiliser can be made by a hydrogen abstraction reaction.

The liquid carrier for the dispersion is a non-polar organic liquid. It can be in particular an aliphatic hydrocarbon. The hydrocarbon can contain up to 30% by weight of other solvents for example, aromatic hydrocarbons and esters.

Preferably, the liquid carrier is a medium to high boiling aliphatic hydrocarbon particularly a hydrocarbon having a boiling point in the range 130°-350° C.

The process is preferably carried out in the presence of a base catalyst. Examples of suitable catalysts are alkali metal carbonates for example sodium carbonate and potassium carbonate, alkali metal hydroxides, for example, sodium hydroxide and potassium hydroxide, quaternary ammonium salts and triaryl alkyl phosphonium salts for example, triphenyl ethyl phosphonium iodide and triphenyl ethyl phosphonium acetate.

Preferably the catalyst is triphenyl ethyl phosphonium iodide.

The sterically stabilised non aqueous dispersion of the compound with at least two epoxy groups may be produced by stirring the compound in the non-aqueous medium in the presence of the stabiliser.

The process may be carried out by slowly adding the diol of formula (1) to a preformed sterically stabilised dispersion of the compound with at least two epoxy groups at a suitable temperature so as to cause the components to react.

Preferably the process may be carried out by firstly mixing the diol of formula (1) with the compound with two epoxy groups and any catalyst for the reaction, subsequently forming a non aqueous dispersion of the mixture in the presence of a steric stabiliser and finally heating the dispersion to cause the components to react.

The reaction may be conveniently carried out at temperatures between 120° and 250° C.

Generally the components are heated for between one and four hours.

Certain dispersions of polyepoxides produced according to the process are novel. Accordingly, the invention also provides a sterically stabilised non-aqueous dispersion of a polyepoxide as previously defined where the dispersion is maintained by a steric stabiliser in which the solvated component is derived from polybutadiene.

It has been found that films cast upon metal substrates from dispersions in which such a preferred stabiliser is used and which are subsequently dried by heating exhibit improved adhesion to the substrate.

Preferably these dispersions have a solids content of at least 60%.

The dispersion produced by the process may be applied by standard methods to suitable substrates.

The present invention also provides a coating process which comprises applying a film of a dispersion as described above and removing the continuous phase by evaporation.

Examples of suitable application methods include spraying, brushing dipping or rollercoating.

After application the continuous phase is conveniently removed by heating to between 100° and 200° C. for between 1 and 10 minutes.

The present invention also provides a coated article which has been coated according to the above coating process.

The dispersions produced by the process of this invention can be formulated by standard methods so as to produce coating compositions. They are particularly suitable for can coatings.

The following Examples illustrate the invention.

EXAMPLES

EXAMPLE 1

1.1 Poly-12-hydroxystearic acid

A mixture of 12-hydroxystearic acid (847.61 g), toluene (150.69 g), and methane sulphonic acid (1.70 g) was heated to between 140°-150° C. Water was removed azeotropically and was replace during its removal by an equal volume of toluene. Water removal was continued from 6 to 7 hours until the acid value was between 32 and 34 mg $g^{-1}$.

The product obtained was a solution of poly-12-hydroxystearic acid in toluene of solids Content 81%.

1.2 Poly-12-hydroxystearic Acid: Glycidyl Methacrylate Adduct

A mixture was made up of the following reagents:

| | |
|---|---|
| poly-12-hydroxystearic acid solution (81% in toluene) | 565.19 g |
| Hydrosol 130–160° C.; <5% | 21.29 g |
| glycidylmethacrylate | 51.63 g |
| Armeen DMCD | 1.92 g |
| hydroquinone | 0.67 g |
| Hydrosol 130–160° C.; <5% | 359.30 g |

(Armeen DMCD is dimethyl "coconut fatty amine") (Hydrosol 130°-160° C. <5% is an aliphatic hydrocarbon mixture containing less than 5% of aromatic hydrocarbon available from Hydrocarbures St Denis, France).

The mixture as described above was heated to reflux (140°-150° C.) for 6 hours until an acid value of 1 mg $g^{-1}$ was obtained. Further amounts (0.67 g each) of Armeen DMCD were added to the refluxing mixture after 3 and 4 hours of reflux. The product was a solution of adduct of 50% solids content.

1.3 Poly-12-hydroxystearic Acid Based Dispersant

The following mixture of reagents was made up:

| | |
|---|---|
| methyl methacrylate | 190.05 g |
| acrylic acid | 10.00 g |
| azodiisobutyronitrile | 3.96 g |
| poly-12-hydroxystearic acid-glycidyl methacrylate adduct | 395.90 g |

The reaction mixture as described above was added over 3 hours to a mixture of butyl acetate (133.37 g) and ethyl acetate (266.72 g) at reflux temperature. When the addition had been completed, heating was continued. After 30 minutes a portion of azodiisobutyronitrile slurry in ethyl acetate (1 g in 1.5 g) was added to the reaction mixture. After a further 30 minutes another portion of azodiisobutyronitrile slurry in ethyl acetate (1 g in 1.5 g) was added.

Following the addition of the second portion of azodiisobutyronitrile, part of the solvent (140 g) was removed by distillation and replaced by Hydrosol 130°-160° C.<5% (140 g). A further portion (140 g) of solvent was removed by distillation and replaced by a further portion (140 g) of Hydrosol 130°-160° C.<5%.

1.4 Epoxide Diol Reaction

A mixture of epoxide GY250 (343.35 g), diphenylol propane (201.23 g), triphenyl ethyl phosphonium iodide (1.09 g) and dispersant prepared as described in paragraph 1.3 above (136.41 g) in high boiling aliphatic solvent b.p. 270°-310° C. (317.92 g) was heated with stirring. The temperature of the reaction mixture was maintained at between 170°-180° C. for 2 hours. The mixture was allowed to cool to produce a dispersion having a 60% solids content of particle size 0.5 μm, viscosity of 0.07 Pas and epoxy equivalent weight of 6,200.

EXAMPLE 2

2.1 Poly-2-Ethylhexyl Acrylate

A mixture of ethyl acetate (297.92 g), 2-ethylhexyl acrylate (198.60 g) and azodiisobutyronitrile (1.99 g) were mixed and heated to reflux temperature. After 15 minutes at reflux temperature a further mixture of 2-ethylhexyl acrylate (496.52 g) and azodiisobutyronitrile (4.97 g) was added dropwise over 1.5 hours. Heating under reflux was continued for a further 1 hour and the product was diluted with ethyl acetate to produce a solution of poly-2-ethylhexyl acrylate in ethyl acetate having a 65% solids content and viscosity of 0.9-1.1 Pas.

2.2 Poly-2-Ethylhexyl Acrylate: Methyl Methacrylate: Acrylic Acid Dispersant

| | |
|---|---|
| Charge 1 | |
| Poly-2-ethylhexyl acrylate (70% in ethyl acetate) | 283.00 g |
| Ethyl acetate | 85.08 g |
| Benzoyl peroxide | 2.66 g |
| Charge 2 | |
| Methyl methacrylate | 188.13 g |
| Acrylic acid | 9.91 g |
| Benzoyl peroxide | 7.96 g |

Charge 1 was made up and heated to reflux temperature for 0.5 hours. Charge 2 was then added at reflux temperature to charge 1 over 1.5 hours. The product so obtained was diluted first to 60% solids by addition of ethyl acetate (88.83 g) and then to 50% solids by addition of a further portion (132.00 g) of ethyl acetate. Heating at reflux temperature was continued and after a further 0.25 hours the solution was diluted to 45% solids by the addition of a further portion of ethyl acetate (88.65 g).

Heating at reflux temperature was continued and two portions of t-butyl per-2-ethylhexanoate (0.99 g) were added to the reaction mixture after 0.5 hourly intervals.

The reaction mixture was diluted with a further portion of ethyl acetate (110.81 g). Heating at reflux temperate was continued for 0.5 hours and a third portion of t-butyl per-2-ethylhexanoate (0.99 g) was added to the reaction mixture. The solvent was then changed from ethyl acetate to a white spirit and ethyl acetate mixture by distilling off portions of ethyl acetate and replacing the volume distilled with an equal volume of white spirit.

The stabiliser so produced can be used in the method of Example 1.4 to prepare a dispersion of epoxy resin.

EXAMPLE 3

3.1 Polybutadiene Methyl Methacrylate/Acrylic Acid Dispersant

| | |
|---|---|
| Charge 1 | |
| Toluene | 593.08 g |
| Polybutadiene (Lithene N4 5000) | 199.47 g |
| Charge 2 | |
| Methyl methacrylate | 189.50 g |
| Acrylic acid | 9.97 g |
| Benzoyl peroxide | 5.32 g |

('Lithene' is a Trademark of Revertex)

Charge 2 was added over 1.5 hours to Charge 1 while Charge 1 was held at reflux temperature. Heating was continued for a further 1.5 hours and two portions (1.33 g) of t-butyl peroctoate were added one each after two 0.5 hour intervals. The solution if allowed to cool produced a clear solution of resin having a viscosity of 70 poise.

The solvent was then changed by portionwise distillation of toluene and addition of white spirit, to give a solvent mixture having equal proportions of toluene and white spirit.

The stabiliser so produced can be used in the method of Example 1.4 to prepare a dispersion of epoxy resin.

EXAMPLE 4

4.1 Polybutadiene Methyl Methacrylate/Methacrylic Acid Dispersant

| | |
|---|---|
| Charge 1 | |
| Toluene | 396.14 |
| Polybutadiene (Lithene N4 5000) | 199.74 |

-continued

| | |
|---|---|
| White Spirit | 197.74 |
| Charge 2 | |
| Methyl Methacrylate | 187.74 |
| Methacrylic acid | 11.98 |
| Lucidol P 25 (Benzoyl peroxide containing 25% water) | 5.33 |
| Trigonox 21B 70 (tert butyl per -2-ethyl hexanoate) | 1.33 |

Charge 2 was added over 1.5 hours to charge 1 at 120°–125° C., reflux temperature. After a further 0.5 hours the Trigonox was added, and heating was continued for a further hour. Solvent (99.1 parts) was removed by distillation and replaced by an equal volume of white spirit.

The product was opalescent with a viscosity of 0.5 to 1.0 Pas and a measured solid content of 37%.

4.2 Epoxide Dispersion

Liquid Epoxy (GY 250 from Ciba Chemicals: 372.5 parts), diphenylol propane (DPP) (218.31 parts), triphenol ethyl phosphonium iodide (1.19 parts), dispersant from Example 4.1 (147.98 parts), and Hydrosol PW2H (predominantly aliphatic solvent from Hydrocarbures St Denis France: 188.59 parts) were charged to a flask fitted with a separator and heated with stirring to 160° C. There was an initial exotherm to 180°–190° C. and the mixture was then maintained at 170°–175° C. The mixture was maintained at 170°–175° C. and after 55 minutes further Hydrosol PW2H (71.43 parts) was added. The mixture was maintained at 170°–175° C. for 1 hour and then allowed to cool to room temperature. The cooled mixture was filtered through a 50 micron nylon mesh. The epoxy equivalent weight was 6467 and the dispersion had a viscosity of 0.18 Pas seconds, and a solid content of 65%.

EXAMPLES 5 TO 9

Dispersions were made by the method of Example 4.2 replacing the Hydrosol PW2H non-aqueous carrier with various other organic liquids. These liquids together with the characteristics of the dispersions obtained are shown in Table 1 below ('Hydrosol' solvents are available from Hydorcarbures St Denis, France, 'Exxsol' 'Isopar' and 'Norpar' solvents are available from Exxon Chemicals.

TABLE 1

| | | | SOLVENT VARIANTS | | | |
|---|---|---|---|---|---|---|
| | | | | DISPERSION | | |
| EX. | CARRIER LIQUID | BP °C. | TYPE | NON-VOL. | Pas | EEW |
| 4.2 | Hydrosol PW2H | 270–310 | 57% Alkanes 40% Cyclo Alkane | 65% | 0.18 | 6467 |

TABLE 1-continued

| | | | SOLVENT VARIANTS | | | |
|---|---|---|---|---|---|---|
| | | | | DISPERSION | | |
| EX. | CARRIER LIQUID | BP °C. | TYPE | NON-VOL. | Pas | EEW |
| 5 | Exxsol D 240-270 | 240–270 | 3% Aromatic Dearomatised | 65% | 0.24 | 6334 |
| 6 | Exxsol D 280-310 | 280–310 | Dearomatised | 65% | 0.30 | 6738 |
| 7 | Isopar M | 205–255 | Isoparaffin | 65% | 0.11 | 6712 |
| 8 | Isopar V | 278–305 | Isoparaffin | 65% | 0.35 | 6915 |
| 9 | Norpar 15 | 252–277 | Linear paraffin | 65% | 0.115 | 6760 |

EXAMPLES 10–20

Dispersions were made according to the method of Example 4.2 but replacing the GY250 liquid epoxy with various other epoxy functional compounds, with the replacement of the DPP diol with several different diol compounds, and with slight variations in iodide catalyst, dispersant, and solvent weights. These are listed in Table 2 together with the properties of the resulting dispersions.

In Table 2:

ERL 4299 is a compound approximated by formula (5) of epoxy equivalent weight 202, available from Ciba Geigy Chemicals.

XPY 306 is a Compound approximated by formula (11) in which D is methylene, of epoxy equivalent weight 156 g from Ciba Geigy.

XPY 307 is an epoxy novolac resin of epoxy equivalent weight 178 g from Ciba Geigy Chemicals.

EPN1139 is an epoxy novolac resin of epoxy equivalent weight 136 g from Ciba Geigy Chemicals.

DEN 438 is an epoxy novolac resin of epoxy equivalent weight 155 g from Dow Chemicals.

DER 330 is a compound approximated by formula (11) of epoxy equivalent weight 174 g from Dow Chemicals.

DER 333 is an epoxide functional compound of approximate formula (11) of epoxy equivalent weight 185 g available from Dow Chemicals, and which already contains a catalyst believed to be triphenyl ethyl phosphonium acetate.

Degussa Diepoxide 133 is a diepoxide compound of formula (8) from Degussa Chemicals of epoxy equivalent weight 133.

DPM is diphenylol methane, a diol of formula (1) in which D is methylene.

LMB 4337 is crude DPM from Ciba Geigy.

DPP is diphenylol propane, a diol of formula (1) in which D is a 2,2-propylene group.

TABLE 2

| EX. | EPOXY (WT) | DIOL (WT) | CAT. WT | DISPERSANT WT TPEPI | SOLVT PW2H (WTS) | NVC VISCO | EEW |
|---|---|---|---|---|---|---|---|
| 10 | GY 250 (388.57 g) | DPM (CIBA) 199.68 g | 1.17 g | 154,38 g | 184.78 + 71.42 | 65% 0.24 | 6887 |
| 11 | ERL 4299 (EEW 202) 390.58 g | DPP 203.98 g | 1.11 g | 138.27 g | 194.42 + 71.6 | 65% 0.152 Pas | 4122 |
| 12 | XPY 306 351.65 g | DPP 235.10 g | 1.2 g | 159.41 g | 181.25 + 71.4 g | 65% 0.20 Pas | 6041 |
| 13 | XPY 307 | DPP | 1.19 g | 148 g | 188.59 + | 65% | 4996 |

TABLE 2-continued

| EX. | EPOXY (WT) | DIOL (WT) | CAT. WT | DISPERSANT WT TPEPI | SOLVT PW2H (WTS) | NVC VISCO | EEW |
|---|---|---|---|---|---|---|---|
| | 372.5 g | 218.31 g | | | 71.4 g | 0.24 Pas | |
| 14 | EPN 1139 372.5 g | DPP 218.3 g | 1.19 g | 148 g | 188.59 + 71.4 g | 65% 0.192 Pas | 4670 |
| 15 | DEN 438 372.5 g | DPP 218.3 g | 1.19 g | 148 g | 188.59 + 71.49 g | 65% 0.192 Pas | 5316 |
| 16 | DER 330 372.5 g | DPP 218.3 g | 1.19 g | 148 g | 188.59 + 71.4 | 65% 0.33 Pas | 5020 |
| 17 | DER 330 365.55 g | DPP 225.26 g | 1.19 g | 148 g | 188.59 + 71.4 g | 65% 0.25 Pas | 7988 |
| 18 | DER 333 372.5 g | DPP 218.3 g | 1.19 g | 148 g | 188.59 + 71.4 g | 65% 0.32 Pas | 3772 |
| 19 | Degussa Diepoxide 133 307.93 g | DPP 249.85 g | 1.25 g | 169.36 g | 164.45 + 107.16 | 62% 0.23 Pas | 2616 |
| 20 | XPY 306 368.0 | DPM (LMB 4337) 215.8 | 1.16 g | 166.80 | 176.79 + 71.4 g | 65% 0.07 Pas | 5565 |

EXAMPLES 21 TO 31

Dispersions with various ratios of epoxy compound to diol compound

Various epoxy dispersions were made by the process of Example 1.4 using the following ingredients:

| | |
|---|---|
| GY250 Epoxy + Diphenylolpropane (DPP) diol | 544.56 g |
| TPEPI Catalyst | 1.09 g |
| PHSA dispersant from Example 1.3 | 136.41 g |
| Hydrosol PW2H Solvent | 317.94 g |

(GY250 is from Ciba Chemicals)
(TPEPI is triphenyl ethyl phosphonium iodide)

The total weight of epoxy and diol compound was kept constant while varying the ratio between the two. The ratios used and the properties of the dispersions obtained are given in Table 3 below:

TABLE 3

| | Ratios of Epoxy to diol | | | | |
|---|---|---|---|---|---|
| | To give 544.56 g | | Theoretical | EEW | NVC Visco |
| EX. | WT GY250 | WT DPP | EEW | Found | Pas |
| 21 | 422.28 | 122.26 | 450 | 550 | 60% 0.07 |
| 22 | 378.90 | 165.66 | 915 | 1182 | 60% 0.072 Pas |
| 23 | 355.58 | 188.98 | 2060 | 2663 | 60% 0.072 Pas |
| 24 | 349.71 | 194.85 | 3000 | 3660 | 60% 0.072 Pas |
| 25 | 346.57 | 197.99 | 4000 | 4673 | 60% 0.072 Pas |
| 26 | 344.63 | 199.95 | 5000 | 5482 | 60% 0.072 Pas |
| 27 | 343.35 | 201.23 | 6000 | 6194 | 60% 0.072 Pas |
| 28 | 342.43 | 202.15 | 7000 | 6570 | 60% 0.072 Pas |
| 29 | 340.79 | 203.79 | 10000 | 9578 | 60% 0.072 Pas |
| 30 | 338.87 | 205.71 | 20000 | 11570 | 60% 0.072 Pas |
| 31 | 336.95 | 207.64 | INFINITY | 14941 | 60% 0.072 Pas |

EXAMPLE 32 TO 42

Ratios of Epoxy Compound to Diol Compound
32.1 to 42.1 Polybutadiene Dispersant

Methyl methacrylate (187.5 parts), methacrylic acid (11.97 parts) and Lucidol P25 (5.23 parts) were added to a mixture of Lithene N 4500 (199.47 parts) and toluene (593.17 parts) at reflux over 1.5 hours. The mixture was held at reflux for 0.5 hours and Trigonox 21B 70 (1.33 parts) was added. The mixture was heated for 0.5 hours and more Trigonox 21B 70 (1.33 parts) was added. The mixture was held at reflux for a further 0.5 hours and about half the toluene was removed by distillation and replaced by white spirit. The resulting product had a solid content of 40% and a viscosity of approximately 10 Pas.

32 to 42 Epoxy Dispersions

Epoxy dispersions were made using the method of 4.2 and the following ingredients:

| | |
|---|---|
| GY250 epoxy + diphenylol propane | 590.91 |
| TPEPI Catalyst | 1.19 |
| Polybutadiene dispersant from Example 32.1 to 42.1 | 147.98 |
| Hydrosol PW2H solvent | 188.59 + 71.43 |

The total weight of epoxy compound and diol compound was kept constant and the ratio between the two was varied the various weights of these together with properties of the dispersions obtained are shown in Table 4.

TABLE 4

| EX. | Ratios of Epoxy to Diol To give 590.81 WT GY250 | WT DPP | Theoretical EEW | EEW Found | NVC Visco Pas |
|---|---|---|---|---|---|
| 32 | 411.08 | 179.73 | 915 | 1145 | 65% 0.224 Pas |
| 33 | 385.78 | 205.03 | 2060 | 2643 | 65% 0.223 Pas |
| 34 | 379.42 | 211.39 | 3000 | 4173 | 65% 0.223 Pas |
| 35 | 376.00 | 214.81 | 4000 | 5065 | 65% 0.253 Pas |
| 36 | 373.90 | 216.91 | 5000 | 5917 | 65% 0.235 Pas |
| 37 | 372.50 | 218.31 | 6000 | 6630 | 65% 0.186 Pas |
| 38 | 371.50 | 219.31 | 7000 | 7184 | 65% 0.258 Pas |
| 39 | 370.76 | 220.05 | 8000 | 8014 | 65% 0.230 Pas |
| 40 | 369.71 | 221.10 | 10000 | 7953 | 65% 0.224 Pas |
| 41 | 367.62 | 223.9 | 20000 | 9986 | 65% 0.186 Pas |
| 42 | 365.56 | 225.25 | INFINITY | 11348 | 65% 0.152 Pas |

EXAMPLE 43

Dispersions Using an Acid Free Dispersant 43.1 The Dispersant

Methylmethacrylate (177.47 parts) and Lucidol P25 (4.73 parts) were added to a mixture of Lithene N4 5000 (221.54 parts) and toluene (593.85 parts) at reflux temperature over 1.5 hours. The mixture was held at reflux temperature for a further 30 minutes and Trigonox 21B70 (1.18 parts) was added. The mixture was held at reflux ratio 0.5 hours and more Trigonox 21B70 (1.18 parts) was added. The mixture was held at reflux temperature for a further 0.5 hours and half of the toluene was then removed by distillation and replaced by white spirit (296 parts). The resulting dispersant was jelly like and had a solid Content of 37%.

43.2 Epoxy Dispersion

GY250 liquid epoxy (372.5 parts), DPP diol (218.30 parts), triphenyl ethyl phosphonium iodide catalyst (1.19 parts), dispersant from example 43.1 (147.99 parts) and Hydrosol PW2H solvent (188.59 parts) were heated to 160° C. with stirring. The temperature rose by exotherm to 175°-185° C., and the time at which it reached 170° C. was taken as time 0. 55 minutes after this time Hydrosol PW2H (71.43 parts) was added. The mixture was held at 170° C. for a further 1 hour and 5 minutes and allowed to cool. The product was a milky dispersion with a solids content of 65%, a viscosity of 0.25 Pas, and an epoxy equivalent weight of 5900.

EXAMPLE 44

Dispersions of Non-epoxy Functional Polymer

GY 250 liquid epoxy (343.26 parts), DPP diol (307.50 parts), TPEPI Catalyst (1.31 parts), the dispersant from example 4.1 (122.3 parts) and Hydrosol PW 2H solvent (225.63 parts) were heated to 160° C. with stirring. The heat was removed and the temperature of the mixture continue to rise to 170° C., and the time at which it reached 170° C. was taken as time zero. The temperature of the mixture continued to rise to 180°-190° C. and when the temperature had ceased to rise the mixture was maintained at 170°-175° C. After one hour the epoxy equivalent in weight of the mixture was 100.000, and after two hours the epoxy equivalent weight was 211.000. After two hours the mixture was cooled and filtered through a 50 microns Nylon mesh. The cooled mixture had a 70% solid content and a viscosity of 0.6 Pas.

EXAMPLE 45

GY 250 liquid epoxy (379.32 parts), diphenylol propane (270.53 parts), triphenyl ethyl phosphonium iodide catalyst (1.31 parts), the dispersant from example 4.1 (122.11 parts) and Hydrosol PW 2H solvent (226.73 parts) were heated to 160° C. with stirring. The heat was removed and the temperature of the mixture Continue to rise to 170° C., and the time at which it reached 170° C. was taken as time zero. The temperature of the mixture continued to rise to 180°-190° C. and when the temperature had eased to rise the mixture was maintained at 170°-175° C. After one hour the epoxy equivalent in weight of the mixture was 34.890, and after two hours the epoxy equivalent weight was 76.423. After two hours the mixture was cooled and filtered through a 50 microns Nylon mesh. The cooled mixture had a 70% solid content and a viscosity of 0.6 Pas.

EXAMPLE 46

GY 250 liquid epoxy (260.62 parts), diphenylol propane (330.16 parts), triphenyl ethyl phosphonium iodide catalyst (1.30 parts), the dispersant from example 4.1 (147.75 parts) and Hydrosol PW 2H solvent (188.69 parts) were heated to 160° C. with stirring. The heat was removed and the temperature of the mixture continue to rise to 170° C., and the time at which it reached 170° C. was taken as time zero. The temperature of the mixture continued to rise to 180° 190° C. and when the temperature had ceased to rise the mixture was maintained at 170°-175° C. After one hour the epoxy equivalent in weight of the mixture was 141,000, and after two hours the epoxy equivalent weight was 197.925. After two hours the mixture was cooled and filtered through a 50 microns Nylon mesh. The Cooled mixture was very thick at 70% thus a part was diluted to 65% solids giving 0.29 Pas.

EXAMPLE 47

Epoxide Dispersion

Liquid Epoxy (GY 250 from Ciba Chemicals: 374.65 parts), diphenylol propane (141.78 parts), adipic acid (49.03 parts) triphenyl ethyl phosphonium iodide (1.19 parts), dispersant from Example 4.1 (148.84 parts), and Hydrosol PW2H (predominantly aliphatic solvent from Hydrocarbures St Denis France: 177.36 parts) were charged to a flask fitted with a separator and heated with stirring to 160° C. There was an initial exotherm to 180°-190° C. and the mixture was then maintained at 170°-175° C. The mixture was maintained at 170°-175° C. and after 55 minutes further Hydrosol PW2H (107.15 parts) was added. The mixture was maintained at 170°-175° C. for 1 hour and then allowed to cool to room temperature. The cooled mixture was filtered through a 50 micron nylon mesh. The epoxy equivalent weight was 8517 and the dispersion had a viscosity of 0.3 Pas and a solid content of 62.59%.

EXAMPLE 48

Epoxide Dispersion

Liquid Epoxy (GY 250 from Ciba Chemicals: 316.81 parts), diphenylol propane (168.46 parts), dimerised fatty acid (Pripol 1013 from Unichem), (39.77 parts) triphenyl ethyl phosphonium iodide (1.01 parts), dispersant from Example 4.1 (125.92 parts), and Hydrosol PW2H (predominantly aliphatic solvent from Hydrocarbures St Denis France: 169.20 parts) were charged to a flask fitted with a separator and heated with stirring to 160° C. There was an initial exotherm to 180°-190° C. and the mixture was then maintained at 170°-175° C. The mixture was maintained at 170°-175° C. and after 55 minutes Hydrosol PW2H (63.41 parts) was added. The mixture was maintained at 170°-175° C. for 35 minutes Hydrosol PW2H (73.76 parts) was added and the mixture was held at 170° to 175° C. for 30 minutes. Hydrosol PW2H (41.66 parts) was added and the mixture was allowed to cool to room temperature. The Cooled mixture was filtered through a 50 micron nylon mesh. The epoxy equivalent weight was 6170 and the dispersion had a viscosity of 0.17 Pas and a solid content of 57½%.

Application of the Dispersions to Metal Substrates

Each of the dispersions from examples 1 to 48 was applied to a steel substrate. The application was carried out using a spinning panel in the following general method. A 15 Cm×15 Cm panel was spun at 2950 rpm and 5 to 6 g of the dispersion was placed on its surface at its center. Spinning was continued for 10 seconds.

Each of the coated panels was heated to 200° C. for 10 minutes in a box oven to remove the continuous phase. The dry films were all of 8 g/m² film weight (approximately 6μ thickness).

Film Properties

All of the dispersions formed good coherent films.

It was found that the dispersion from Example 1 and 21 to 31 produced a film which had poor adhesion to the metal substrate.

It was found that the dispersion from Example 2 produced a film which was rather soft and which had somewhat poor adhesion to the substrate.

It was found that the dispersions from Examples 3 to 20 and 32 to 48 all produced films which had excellent adhesion to the metal substrate.

We claim:

1. A process for preparing a sterically stabilised non aqueous dispersion of a polyepoxide of epoxy equivalent weight in the range 350 to infinity, which comprises reacting a sterically stabilised non-aqueous dispersion of a compound with at least two epoxy groups with a diol of formula (1)

HO—B—OH    (1)

in which B is a group of formula (2)

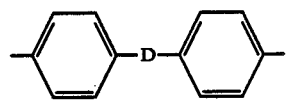

(2)

where D is a methylene group or propane-2,2-diyl.

2. A process according to claim 1 in which the polyepoxide is of formula (4)

A¹—O—B—O[A²—O—B—O]$_a$—A¹    Formula (4)

in which a is a number such that the epoxy equivalent weight is in the range 350 to infinity, B is a group of formula (2) and, A¹ is hydrogen or a group of formula (6)

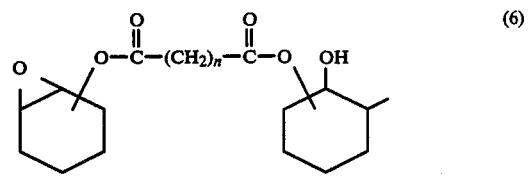

(6)

in which is from 1 to 4, and A² is a group of formula (7)

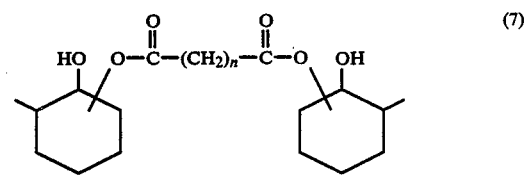

(7)

in which n is as in formula (6) or;

A¹ is hydrogen or a group of formula (9)

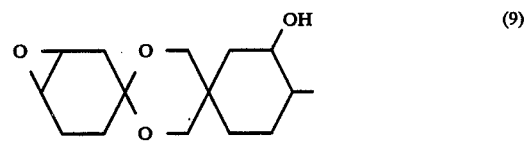

(9)

and A² is a group of formula (10)

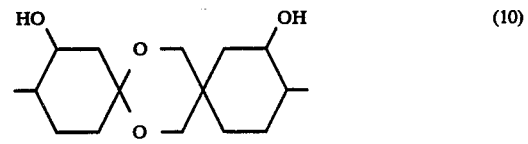

(10)

or; A¹ is hydrogen or a group of formula (12);

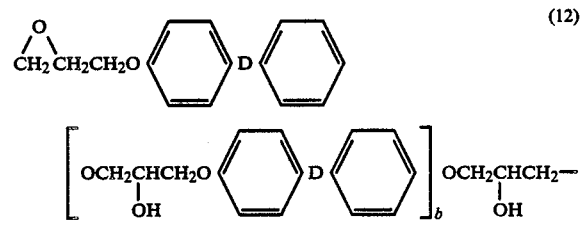

(12)

D is a methylene group or propane -2,2-diyl and b is from 0 to 2, and $A^2$ is a group of formula (13)

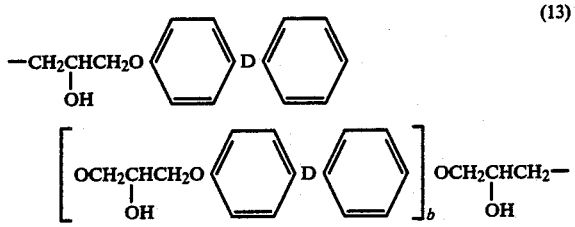

is which D and b are as in formula (12).

3. A process according to claim 1 in which the compound with at least two epoxy groups is an epoxy novolac compound.

4. A process according to claim 2 in which $A^1$ is hydrogen or a group of formula (12), $A^2$ is a group of formula (13) and D is propane -2,2-diyl.

5. A process according to claim 4 in which b is 0.1 to 1.

6. A process according to claim 2 in which $A^1$ is hydrogen or a group of formula (6), $A^2$ is a group of formula (7) and n is 4.

7. A process according to claim 1, in which D is propane-2,2-diyl.

8. A process according to claim 1 in which the epoxy equivalent weight is in the range 350 to 500,000.

9. A process according to claim 8 in which the epoxy equivalent weight is in the range 350 to 250,000.

10. A process according to claim 9 in which the epoxy equivalent weight is in the range 350 to 25,000.

11. A process according to claim 1 in which the steric stabiliser for the epoxy resin comprises an anchor component associated with the epoxy resin which is a homopolymer of methyl methacrylate or a copolymer of methyl methacrylate and acrylic or methacryic acid, and a solvated component derived from polybutadiene.

12. A process according to claim 1 in which the non-aqueous continuous phase is an aliphatic hydrocarbon with a boiling point in the range 130°-350° C.

13. A sterically stabilised non-aqueous dispersion of a polyepoxide produced according to the process of claim 1 which is maintained in a stable state of dispersion by a steric stabiliser which comprises an anchor component associated with the epoxy resin which is a homopolymer of methylmethacrylate or a copolymer of methylmethacrylate and acrylate or methacrylic acid and a solvated component derived from polybutadiene.

14. A sterically stabilised non-aqueous dispersion according to claim 13 which has a solids content of at least 60%.

15. A coating process which comprises the steps applying a film of the dispersion according to claim 13 to a suitable substrate and removing the continuous phase by evaporation.

16. A coated article which has been coated according to a process as claimed in claim 15.

* * * * *